United States Patent [19]

Labate et al.

[11] Patent Number: 4,552,343

[45] Date of Patent: Nov. 12, 1985

[54] COMBINATION ELECTRIC FURNACE AND SLAG RETAINING POURING SPOUT

[75] Inventors: Michael D. Labate, Ellwood City; Joseph A. Perri, Coraopolis, both of Pa.

[73] Assignee: Insul Company, Inc., East Palestine, Ohio

[21] Appl. No.: 732,941

[22] Filed: May 13, 1985

[51] Int. Cl.[4] ............................. C21C 5/44; C21C 5/52
[52] U.S. Cl. .................................. 266/200; 75/10 R; 75/12; 373/71; 373/72
[58] Field of Search ...................... 266/200; 75/10–12, 75/49; 373/71, 72, 75, 79, 84

[56] References Cited

U.S. PATENT DOCUMENTS

| | | | |
|---|---|---|---|
| 2,360,065 | 10/1944 | Lewis | 266/37 |
| 2,458,236 | 1/1949 | Wolft | 263/12 |
| 3,761,242 | 9/1973 | Finkl | 75/49 |
| 3,871,632 | 3/1975 | Wunsche | 266/200 |
| 4,324,943 | 4/1982 | Stenkvist | 373/72 |
| 4,435,812 | 3/1984 | Guido | 373/72 |

OTHER PUBLICATIONS

O'Loughlin, "The Oh, So Simple Charms of EF Bottom Tapping", Metal Producing, vol. 33, pp. 66–69, (Apr. 1984).

Primary Examiner—Peter D. Rosenberg
Attorney, Agent, or Firm—Harpman & Harpman

[57] ABSTRACT

The combination of an electric furnace and a slag retaining pouring spout thereon in registry with a modified tap hole is disclosed. The tap hole located in one end of the electric furnace communicates with the interior thereof and the slag retaining pouring spout is positioned on the electric furnace and in communication with the tap hole. The slag retaining pouring spout is angled upwardly and outwardly with respect to the tap hole and positioned above of the molten metal and slag in the operating electric furnace and receives molten metal from the electric furance when the same is tilted to pour the molten metal through the tap hole. The slag retaining pouring spout has a secondary tap hole therein normally closed with a consumable plug during the operation of the electric furnace and the early tap of the molten metal therefrom into the slag retaining pouring spout. A lever arm on the pouring spout carries a plate forming a gate for the secondary tap hole and a circular Argon delivering shroud is positioned around the secondary tap hole. The combination acts to deliver only slag-free molten metal, such as steel, from the electric furnace.

11 Claims, 4 Drawing Figures

COMBINATION ELECTRIC FURNACE AND SLAG RETAINING POURING SPOUT

BACKGROUND OF THE INVENTION

1. Technical Field:

This invention relates to electric furnaces and more particularly to electric furnaces with means producing better quality steel by tapping slag-free.

2. Description of the Prior Art:

Prior electric furnaces have utilized bottom tapping in an effort to deliver a slag-free steel, such as described for example in the article spanning pages 66–69 in the April 1984 issue of *Metal Producing*. A continuous pouring furnace tiltable to deliver molten metel from sidewardly positioned tap holes is disclosed in U.S. Pat. No. 2,458,236 and an apparatus for separating slag from molten metal is disclosed in U.S. Pat. No. 2,360,065.

The present invention combines an effective new and novel slag retaining spout with an electric furnace and places the spout in registry with a piped angular tap hole in the electric furnace resulting in the ability of the new combination to deliver slag-free molten steel so important in today's highly competitive market and essential when the molten metal is processed by a continuous caster.

SUMMARY OF THE INVENTION

A combination electric furnace and a slag retaining pouring spout on an end wall of the electric furnace in communication with a piped angular tap hole arranges the slag retaining pouring spout in an angular configuration with respect to the end wall in which the tap hole is located and provides a consumable tap hole plug in a secondary tap hole in the pouring spout, the arrangement of the slag retaining pouring spout being such that such slag as initially enters the pouring spout is retained above the molten metal therein until the consumable tap hole plug is dislodged whereupon the further tilting of the electric furnace and the slag retaining pouring spout thereon insures the delivery of slag-free steel therefrom. At the time the tapping of the electric furnace is substantially completed, the further tilting of the electric furnace and the slag retaining pouring spout acts to deliver the molten slag through a sideward extension of the pouring spout so as to insure the separation of the slag from the previously poured slag-free steel.

DESCRIPTION OF THE PREFERRED EMBODIMENT

Figure 4:
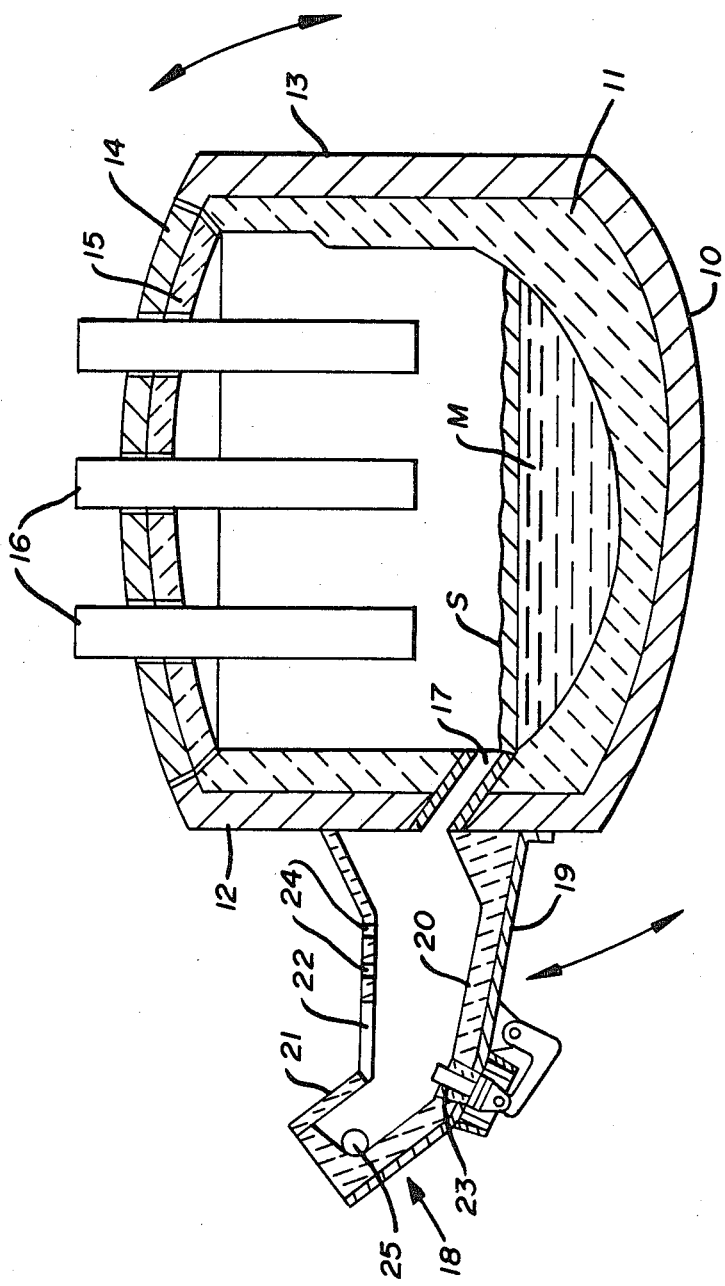
FIG. 4 is a vertical section of the combination electric furnace and slag retaining pouring spout in the position in which the electric furnace is operating.

In its preferred form, the combination electric furnace and slag retaining pouring spout is illustrated in the vertical section of FIG. 4 of the drawings in its operational position refining steel, the electric furnace including a vessel comprising a shell 10 and a refractory lining 11, the vessel having oppositely disposed ends 12 and 13 and a removable lid 14 as customary in the electric furnace art. The lid 14 is provided with a refractory lining 15 and apparatus, not shown, movably mounts a plurality of electrodes 16, also as known in the art.

Figure 1:
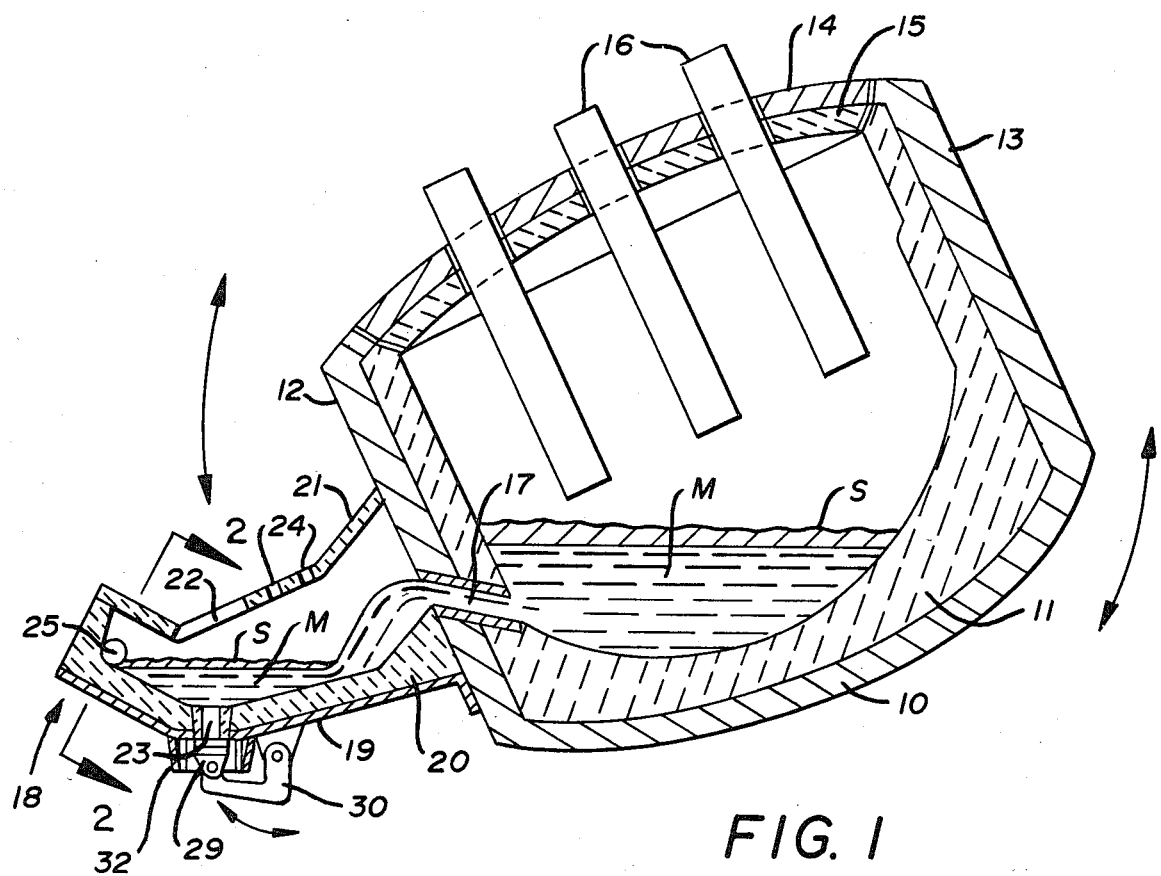
FIG. 1 is a vertical section through the combination electric furnace and slag retaining pouring spout showing the device in initial tapping position.

The vessel is arranged for pivotal motion on a transverse axis so that the end wall 12 will move downwardly in various degrees, one of which is illustrated in FIG. 1 of the drawings. Directional arrows in FIGS. 1 and 4 of the drawings indicate such movement.

A piped tap hole 17 is angularly positioned through the end wall 12 and a slag retaining pouring spout 18 is attached to the end wall 12 of the shell 10 of the electric furnace vessel and in communication with the piped angular tap hole 17. The slag retaining pouring spout is formed of a secondary shell 19 and lined with a refractory liner 20, the shell 19 and liner 20 being substantially U-shaped in cross section, as shown for example in FIG. 2 of the drawings.

A cover 21 is positioned over the slag retaining pouring spout 18 and is provided with an opening 22 through which a closure, sometimes known as a dart (not shown), may be positioned to close off a secondary tap hole 23. Ports 24 in the cover 21 are provided for the injection of Argon gas if required. Additionally, the slag retaining pouring spout 18 has a slag removal opening 25 in its upper outermost end, in that portion which is disposed at an angle with respect to the portion of the slag retaining pouring spout attached to the shell 10 of the electric furnace vessel.

Figure 2:
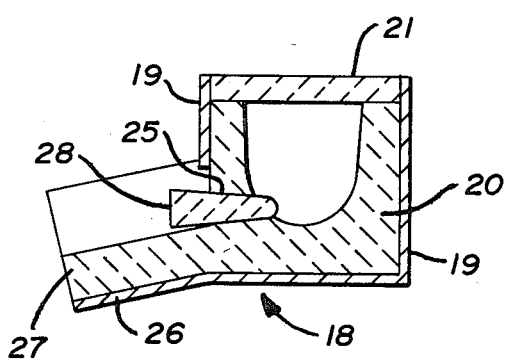
FIG. 2 is an enlarged section on line 2—2 of FIG. 1.

In FIG. 2 of the drawings, a substantially vertical section on line 2 to FIG. 1 illustrates the substantially U-shaped cross sectional configuration of the refractory liner 20 of the slag retaining pouring spout and a sideward extension 26 having a similar U-shaped refractory liner 27 which communicates with the slag removing opening 25 as hereinbefore described.

In FIG. 2 of the drawings, a consumable tap hole plug 28 is illustrated in the opening 25. By referring again to FIG. 4 of the drawings, it will be seen that the vessel forming the electric furnace is illustrated in its normal operating condition wherein electric arcs are maintained between the electrodes 16 and the molten metal M therein, it being understood that the electrodes 16 are electrically connected with a suitable source of electrical current as will be understood by those skilled in the art.

The refining of the molten metal M, for example steel, results in the production of slag indicated by the letter S so that a pool of molten steel M with the layer of molten slag S thereon lies below the piped angular tap hole 17 of the electric furnace and it will be understood that when the steel is ready for tapping, the vessel comprising electric furnace with the attached slag retaining pouring spout 18 is tilted so that the end wall 12 moves downwardly to the position illustrated in FIG. 1. Initially there will be some flow of the molten slag S through the piped angular tap hole 17 and a small amount will accordingly flow into the slag retaining pouring spout 18. As the vessel forming the electric furnace continues to tilt to the position shown in FIG. 1, the molten metal M, such as steel, will then flow through the piped angular tap hole 11 into the slag retaining pouring spout 18 which will be retained therein in the pocket formed by the angular configuration of the slag retaining pouring spout 18 as best shown in FIG. 1 of the drawings.

The secondary tap hole 23, which is located in the slag retaining pouring spout 18, is initially closed by a consumable tap hole plug, such as known in the art, and the life of the tap hole plug in the secondary tap hole 23 is such that it will not permit the molten slag in the slag retaining pouring spout 18 to flow downwardly through the secondary tap hole 23. As the vessel comprising the electric furnace continues to tilt, the molten metal, such as steel, flows into the slag retaining pouring spout 18 and lifts the layer of slag above the secondary tap hole 23 and the consumable plug therein. The consumable plug disintegrates and the molten steel can then flow downwardly through the secondary tap hole 23 into a receiving vessel such as a ladle, not shown.

Figure 3:
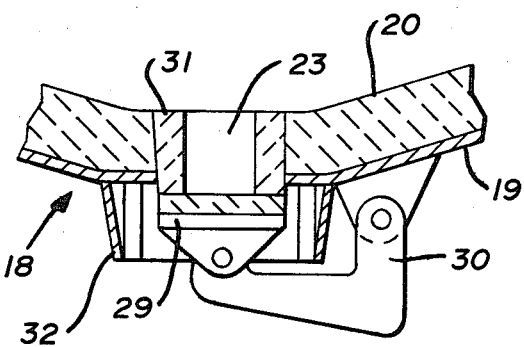
FIG. 3 is an enlarged detail of a lever arm and flap gate arranged for registry with the secondary tap hole seen in FIG. 1.

In FIGS. 1 and 4 of the drawings, a flap gate comprising a closure 29 on the end of a lever arm 30 will be positioned in open relation rather than closed as illustrated in FIGS. 1 and 4 of the drawings. At the termination of the tapping of the desirable molten metal, such as steel, and before the slag M has reached the secondary tap hole 23, the closure 29 on the lever arm 30 is moved to closed position as shown in enlarged detail in FIG. 3 of the drawings, thus stopping the flow of the metal and preventing the contamination of the tapped metal by the slag S. At this time, the vessel comprising the electric furnace is tilted to a greater degree than illustrated in FIG. 1 of the drawings, whereupon the slag will flow into and out of the slag removal opening 25 from which the consumable tap hole plug has been removed. Such slag is directed to a slag pot or like disposal receptacle, as will be understood by those skilled in the art.

By referring again to FIGS. 1 and 3 of the drawings, it will be seen that a tap hole brick 31 defines the actual secondary tap hole 23 and that the closure 29 pivoted to an end of the lever arm 30 is arranged to engage the tap hole brick 31. It will also be seen that surrounding the lower portion of the tap hole brick 31, an Argon shroud 32 is provided. The Argon shroud is a circular structure of a diameter greater than the closure 29 and has means for receiving Argon gas from a suitable source. The outer wall of the circular Argon shroud 32 is preferably provided with circumferentially arranged, substantially vertically extending corrugations so that the lower edge of the shroud forms a plurality of closely spaced, jet-like openings communicating with an enlarged annular area thereabove into which the Argon gas is introduced. The downward flowing circular pattern of Argon gas as formed and directed by the Argon shroud 32 protects the slag-free metal flowing through the secondary tap hole 23 from atmostpheric contamination and the like.

It will occur to those skilled in the art that the principal point of novelty in the present disclosure is the combination of the vessel of the electric furnace with the slag retaining pouring spout affixed thereto and communicating therewith by way of the piped angular tap hole 17. This construction and the particular angular relation of the portions of the slag retaining pouring spout 18 and its relation to the end wall 12 of the electric furnace vessel will be seen to make possible the tapping of slag-free metal, such as steel, from the electric furnace.

It will also occur to those skilled in the art that when the major portion of the metal being tapped has moved through the secondary tap hole 23 in the slag retaining pouring spout 18, the closure 29 on the lever arm 30 may be used to stop such flow or alternately a closure, such as known in the art as a dart, may be introduced into the secondary tap hole 23 in the slag retaining pouring spout 18 through the opening 22 in the cover 21 thereof as heretofore explained.

The first portion of the pouring spout 18 adjacent the furnace is disposed at an angle of about 10° from horizontal and the outer or second portion of the pouring spout 18 disposed at an angle of about 50° from horizontal. The angularly disposed tap hole 11 in the furnace is disposed at an angle of about 35° from horizontal and the secondary tap hole 23 is located in the bottom of the pouring spout at the junction of the two angular portions thereof.

It will thus be seen that a combination electric furnace and slag retaining spout formed thereon has been disclosed and having thus described our invention, what we claim is:

1. The combination of an electric steel making furnace which has a tap hole and a slag retaining pouring spout in communication with said tap hole, said slag retaining pouring spout extending outwardly from said steel making furnace in an outwardly and upwardly angled configuration, said slag retaining pouring spout having a secondary tap hole therein and said electric furnace being arranged to be tilted so as to move said slag retaining pouring spout in a generally vertical arcuate path whereby tilting said electric furnace to move said slag retaining pouring spout downwardly will cause molten slag and metal in said electric furnace to flow through said tap hole into said slag retaining pouring spout, a closure removably affixed in said secondary tap hole for retention therein whereby said molten slag and molten metal are retained in said slag retaining pouring spout for a period of time sufficiently to float said slag above said secondary tap hole.

2. The combination of claim 1 wherein said tap hole in said furnace is angled upwardly and outwardly toward said slag retaining pouring spout.

3. The combination of claim 1 wherein a first portion of said slag retaining pouring spout extends outwardly and upwardly from said furnace at a first angle from horizontal and a second portion of said slag retaining spout extends beyond said first portion at a second angle from horizontal greater than said first angle.

4. The combination of claim 1 and wherein said slag retaining pouring spout is formed in two angular portions and the secondary tap hole is located at the junction of the two angular portions.

5. The combination of claim 1 and wherein a tap hole plug having a known life when subjected to molten metal is positioned in said secondary tap hole so as to disintegrate after a pool of molten metal has formed in said slag retaining pouring spout.

6. The combination of claim 1 and wherein a cover is positioned on said slag retaining pouring spout.

7. The combination of claim 1 wherein a closure mounted on a lever arm pivoted to said pouring spout is movable into and away from engagement with said secondary tap hole.

8. The combination of claim 1 and wherein a shroud is positioned around the secondary tap hole, said shroud having a double walled body forming a chamber for the reception of a gas and configurations in said double walled body forming a plurality of circumferentially arranged jet forming openings directed downwardly from said secondary tap hole.

9. The combination of claim 1 and wherein a sideward extension is formed on said pouring spout adjacent one end thereof and an opening in said pouring spout communicates therewith.

10. The combination of claim 1 and wherein said furnace has a first metal shell and said pouring spout has a second metal shell supported on said first metal shell.

11. The combination of claim 1 and wherein said pouring spout has a metal shell and a refractory lining removably positioned therein.

* * * * *